March 15, 1949.    J. H. GRAHAME    2,464,501
CATALYTIC SYNTHESIS OF HYDROCARBONS
Filed Sept. 19, 1946
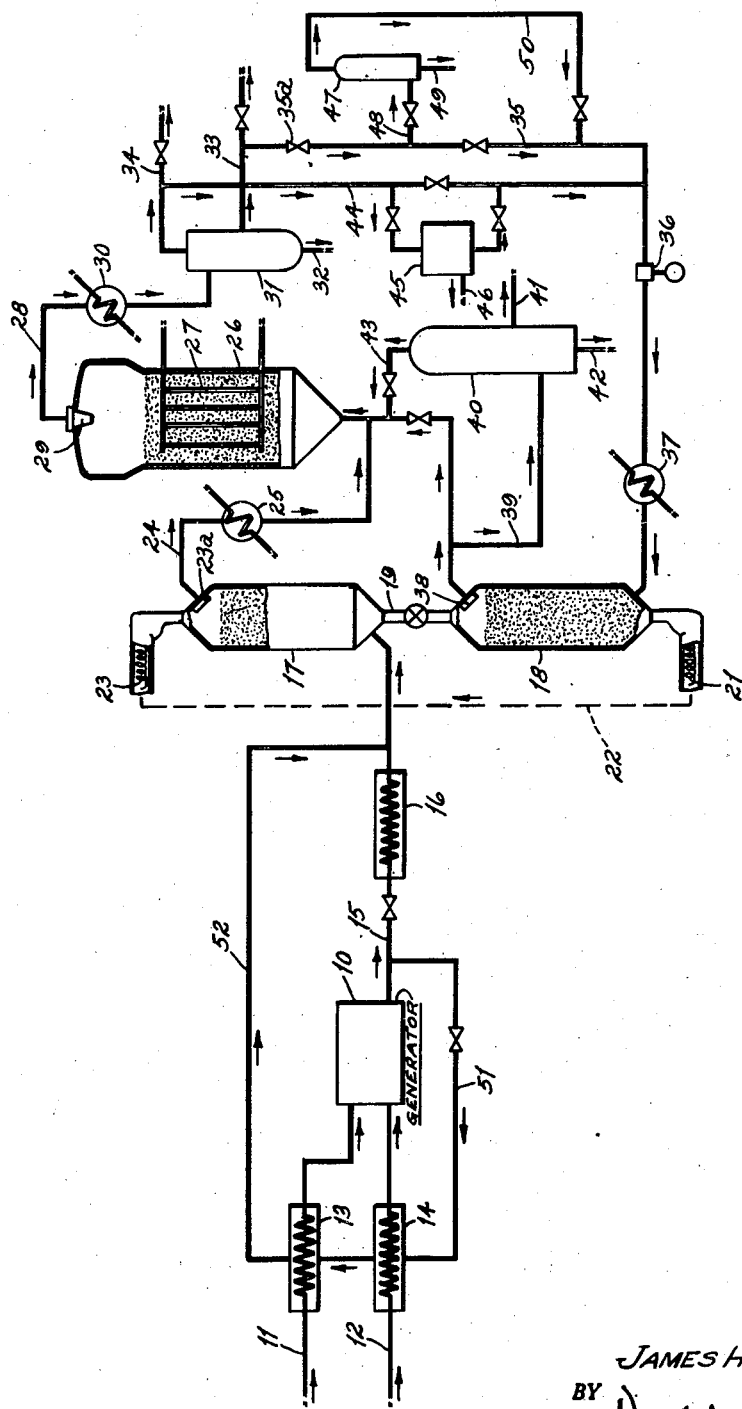
INVENTOR.
JAMES H. GRAHAME
BY Daniel Stryker
ATTORNEY Patented Mar. 15, 1949

2,464,501

UNITED STATES PATENT OFFICE 2,464,501

CATALYTIC SYNTHESIS OF HYDROCARBONS

James H. Grahame, Mount Vernon, N. Y., assignor to The Texas Company, New York, N. Y., a corporation of Delaware Application September 19, 1946, Serial No. 697,960

13 Claims. (Cl. 260—449.6)

The present invention relates to the synthesis of hydrocarbons by the catalytic reductions of carbon oxide with hydrogen and is particularly concerned with the improvement in both yield and properties of liquid hydrocarbons produced by the reaction.

It is known that a stream of carbon monoxide and hydrogen, upon passage in contact with a synthesis catalyst comprising, for instance, a metal of the iron group, at suitable elevated temperature, under elevated pressure or not results in the synthesis of hydrocarbons which may be separated and recovered from by-product watervapor or carbon dioxide or both. The normally liquid products usually tend toward characteristic straight-chain aliphatic compounds with a more or less inevitable proportion of oxygenated hydrocarbons, as a result of which, reforming or any conversion which results in branching or isomerization of hydrocarbons and dehydration of oxygenated compounds to produce olefins, causes an improvement in respect to anti-detonation characteristics. The same is true where the product is treated to effect an increase in unsaturation. However, further treatment of the product involves a separate processing with uneconomic expenditure of additional thermal energy and corresponding product loss.

It is an object of the present invention to provide an integrated process wherein desirable conversion of hydrocarbon products of the foregoing synthesis is obtained and additional yields secured of products having improved properties.

A further object contemplates an integrated process as above wherein the thermal requirements of hydrocarbon conversion are made up by the sensible heat resulting from the exothermic energy of the synthesis gas generator.

Yet another object of the present invention contemplates an improved operating flexibility permitting selective conversion of any desired portions of the hydrocarbon reaction products from the synthesis reactor with return of appropriate converted fractions to the synthesis reactor.

In accordance with the present invention, a synthesis gas generator operating at typically high temperatures supplies a mixture of essentially hydrogen and carbon monoxide to a catalytic synthesis reactor, hydrocarbon products of which are circulated to a hydrocarbon conversion step thermally supported by the sensible heat of the generator effluent. More specifically, the synthetic hydrocarbons are converted in a zone supplied with the necessary heat energy by a heat accumulating material receiving its thermal energy directly from the high temperature synthesis gas, the heat accumulating material preferably comprising a solid thermophore which is successively raised to a high temperature in direct contact with the generator effluent and thereafter passed through the hydrocarbon conversion zone.

The term "solid thermophore" as used herein means solid particles, heat absorptive material having the property of absorbing substantial quantities of sensible heat in a high temperature zone and making said heat available when transferred to a low temperature zone.

Advantageously, the thermophore may be a typical catalyst for the selected conversion reaction. This may be, for instance, a conventional isomerization catalyst where a motor gasoline fraction is under treatment. In the case of bauxite, for example, there is not only an isomerization of the hydrocarbons, but a dehydration of oxygenated hydrocarbons to form unsaturated hydrocarbons of desirable motor gasoline characteristics. Correspondingly improved effects may be secured where the catalyst is a combination isomerization and dehydrogenation catalyst. In fact, under such conditions, the normally gaseous hydrocarbons from the synthesis reactor may be so treated with or without the liquid product fractions, and all of the unsaturated and branched gaseous hydrocarbon products of the conversion may advantageously be recycled to the synthesis reactor with an improved overall yield and quality of liquid hydrocarbons.

The invention is, however, not limited to the foregoing types of hydrocarbon conversion mentioned by way of preference, but may include the conversion of the hydrocarbons in accordance with any selected type of conventional treatment involving endothermic heat energy requirements at high temperatures above that of the hydrocarbon synthesis reaction.

In order to describe the invention more specifically, reference is had to the figure of the drawing wherein one embodiment is set forth more or less diagrammatically.

The numeral 10 thereof indicates symbolically a synthesis gas generator fed with streams of oxygen and methane, respectively, from any convenient source, not shown, through inlet pipes 11 and 12. The respective streams, in advance of the generator, pass through preheaters 13 and 14, respectively, in indirect heat exchange relation to a flow of heating gas hereinafter to be described, and are raised to appropriate temperature, as for example, 900° F.

At the generator 10 the two streams meet, preferably in a mixing nozzle in the approximate molar ratio of 2 parts methane to 1 part oxygen at a temperature of, for example, 2100° F. Under these conditions, the gaseous effluent from the generator passing outwardly through pipe 15 comprises essentially hydrogen and carbon monoxide in the molar ratio of approximately 2:1.

It is to be understood that the invention is not limited to the foregoing type of generator or feed gases but on the contrary may comprise any type of generator, the outlet of which supplies a synthesis gas comprising essentially carbon monoxide and hydrogen at an elevated temperature, for example, above 1000° F. Such may include any of the previously proposed generators for the partial combustion of any hydrocarbons, together with oxygen, or oxygen compounds, such as water-vapor or carbon dioxide.

The synthesis gas in pipe 15 may be passed through a suitable cooling unit or heat exchanger 16 to lower the high initial temperature from, for example, 2100° F. down to about 1500° F., suitable for the hydrocarbon conversion step.

The hydrocarbon conversion is carried out in a system comprising a pair of vertically disposed chambers 17 and 18 through which catalyst is circulated by suitable arrangement of feeding and conveying devices. More specifically, the chamber 17, which operates as a heat accumulating or catalyst preheating chamber, has a conical lower portion merging with a standpipe 19 controlled by a star feeder 20. The lower reaction or conversion chamber 18 similarly discharges at its lower portion into a screw conveyor 21 which delivers catalyst continuously to an elevator designated by the dotted line 22. The elevator 22 in turn delivers to an upper screw conveyor 23 which recycles catalyst directly into the upper chamber 17. By appropriate coordination of the feeding and conveying means, the catalyst may be continuously circulated in the closed cyclic path shown while at all times maintaining approximate predetermined levels of catalyst in the respective chambers.

The stream of synthesis gas is delivered by pipe 15 into the lower portion of the preheating chamber 17, passing upwardly through the catalyst in countercurrent relation and heating it to any selected temperature by direct countercurrent heat exchange. Effluent gases from the mass of catalyst pass through refractory filter 23a, pipe 24, and cooler 25 to the lower portion of synthesis reactor 26.

The synthesis reactor, shown only symbolically, may embody any typical type of reaction unit as, for example, a chamber containing a mass of fluidized synthesis catalyst immersing a suitable heat exchanger 27 adapted to maintain a uniform predetermined temperature during operation. Accordingly, the synthesis gases passing upwardly through the fluidized mass of catalyst separate from the upper pseudo-liquid level and pass into the outlet pipe 28 through a suitable ceramic filter 29. The gaseous reaction products are successively cooled in the condenser 30 and subjected to physical separation by a separator 31 into a water layer, an overlying liquid hydrocarbon layer, and a normally gaseous residue. The water layer is withdrawn by way of pipe 32, the liquid hydrocarbons by way of pipe 33, and the normally gaseous stream passes overhead as at 34.

In accordance with the present invention, the hydrocarbon product or any selected portion thereof is subjected to catalytic conversion by the action of the hot catalyst previously withdrawn from direct exchange with the generator effluent. To this end the pipe 33 is provided with a branch pipe 35 controlled by a valve 35a. The liquid hydrocarbons may, therefore, be passed by way of a pump 36 and heat exchanger 37 into the lower portion of the catalytic conversion chamber 18. Heat exchanger 37 may be connected to exchange heat with condenser 30 or exchanger 25. It, however, may be of material advantage only where liquid hydrocarbons are to be vaporized and accordingly may be by-passed or omitted where only normally gaseous hydrocarbons are being subjected to conversion as will be hereinafter more fully described.

This arrangement is suitable where the synthesis reactor 26 is operated under such conditions as to result in a liquid product essentially in the motor gasoline boiling range. Thus the stream in question is passed upwardly in direct countercurrent contact with the hot catalyst in the chamber 18 at appropriate optimum conversion temperature such that the hydrocarbon stream is subjected, for example, to dehydrogenation and isomerization. The converted gasiform reaction products are withdrawn through filter 38 and valved pipe 39 to the lower portion of any suitable fractionation or separation system represented symbolically as at 40. The separation system discharges a primary product of motor gasoline by way of the outlet pipe 41. Heavier fractions, if any, may be removed through lower pipe 42, and normally gaseous hydrocarbon fractions are passed by way of the valved pipe 43 into the lower portion of the synthesis reactor 26.

The normally gaseous hydrocarbon fractions largely in a state of unsaturation after passage in contact with the dehydrogenating catalyst, as well as unsaturated hydrocarbon gases resulting from dehydration of light oxygenated hydrocarbons, are consumed in the hydrocarbon synthesis step presumably by reaction with the active fresh feed gases or with the incipient or nascent products of synthesis to form additional hydrocarbons boiling in the liquid hydrocarbon ranges. In short, a net increase in the formation of liquid hydrocarbon ensues as contrasted with an operation wherein normally gaseous unsaturated hydrocarbons resulting from hydrocarbon conversion steps are recovered as such and not returned to the process.

The present embodiment further takes advantage of this important effect by providing outlet pipe 34 with a valved branch pipe 44 joining with the recycle pipe 35. By this means, any selected portion, or all, of the gaseous hydrocarbons in the reactor effluent may be returned to the recycle stream in admixture with the liquid hydrocarbons. It will be preferred that the streams be so handled that they reach the conversion chamber 18 at regular predetermined rates of supply and are constantly introduced in any selected relative proportions. Separate pipe lines, not shown, for the normally liquid and normally gaseous streams will insure this effect. If desired the catalytic conversion step may be operated on a stream of normally gaseous hydrocarbons preferably in the $C_2$—$C_4$ range, to the exclusion of a liquid feed. The normally gaseous hydrocarbons from the reactor are thus isomerized and dehydrogenated in the chamber 18, and ultimately return through pipe 43 into the gaseous inlet feed of the reactor 26.

A number of modified arrangements may be advantageously employed depending upon the specific reactions selected and the products desired. Thus, for example, where the gaseous stream in pipe 44 contains a substantial portion of inerts or some undesired component it may be by-passed through a gas recovery plant designated diagrammatically by the reference numeral 45. The plant 45 may take any conventional form appropriate to the separation desired. For example, where substantially pure hydrocarbon gases are to be recycled to the chamber 18 the recovery system may include any typical hydrocarbon absorption and stripping arrangement. On the other hand, where carbon dioxide is in excess, a conventional absorption system involving, for example, a tri-ethanol amine absorbent may be employed to scrub out this gas. In such case the carbon dioxide separated through the outlet pipe 46 may be recycled to the synthesis gas generator to be reacted with additional hydrocarbon for the generation of additional synthesis gas. Usually, however, carbon dioxide is intentionally recycled to the synthesis reactor so that carbon dioxide in the total feed is maintained at a relatively high level which tends to suppress net carbon dioxide formation during hydrocarbon synthesis. Thus carbon dioxide may either be separated and recycled directly, or if, in the catalytic conversion processes mentioned it is not objectionable, it may flow through the converter with the hydrocarbons.

Moreover, when subjecting liquid hydrocarbons from the synthesis reactor to isomerization, dehydration and/or dehydrogenation, it may be advantageous to separate any fractions boiling higher than motor gasoline in order to avoid undesired conversion of the characteristically good diesel oil fractions, for example, to a product of lower octane value. To this end the products conveyed in pipe 35 may be by-passed into a fractionation system 47 through valved inlet pipe 48. The higher boiling fractions are recovered through outlet pipe 49 and the lower boiling motor gasoline fractions pass overhead and are returned, via valved pipe 50, to the line 35. Obviously any predetermined fraction can be separated in this manner. Moreover, suitable gas oil fractions may be selectively included in the stream to converter 18 when cracking is a desired function thereof.

It will be apparent from the foregoing that the present invention is, among other things, particularly advantageous in effecting good conservation of heat energy in a system where a stream of gases as, for example, a synthesis gas generator effluent is encountered at such high temperatures that handling and heat recovery presents a difficult problem. In accordance with the present invention, however, the gases are exchanged directly with a suitable relatively inert and refractory material. This constitutes an effective means for recovering thermal energy at high temperatures and cooling the gas stream to a level where further handling is simplified.

A portion of the hot synthesis gas may be recycled through valved branch pipe 51 successively through the indirect heat exchangers 13 and 14 mentioned above, the somewhat cooler return stream being handled by pipe 52 connecting with the pipe 15 at the outlet of the exchanger 16. As indicated above, there is a wide permissible variation in the disposition and arrangement of the heat exchanging devices involved in the present invention. The exchanger 16 may involve a waste heat boiler or alternatively may be interconnected with the heat exchanger 37 to preheat the hydrocarbon stream in pipe 35. In short, the higher level of temperature in the conduit 15 permits heating of the stream 35 to a level appropriate for conversion. On the other hand, both of these exchangers may obviously be obviated by appropriate proportioning of the chambers 17 and 18 and use of a catalyst-feed ratio such that the synthesis gas is adequately cooled by the catalyst or thermophore. Should the sensible heat of the thermophore be excessive, additional heat exchange means in the form of a waste heat boiler or equivalent devices may be interposed within the circulating stream of catalyst, for example, subsequent to the chamber 18. In any event, the process permits recovery of heat energy by indirect exchange, at the several points indicated as required.

Referring by way of example to one specific method of operation, a synthesis gas generator is supplied with a stream of substantially pure methane and a stream of oxygen of 98% purity, both preheated to 900° F., and in the respective molar ratio of 2:1. The generator operates at a temperature of 2100° F. and a pressure of about 200 lbs. per square inch gauge. The reaction gases, comprising essentially hydrogen and carbon monoxide in the molar ratio of 2:1, leave the generator at the temperature of about 2100° F. and are cooled to about 1200° F. in a waste heat boiler. From there they pass in direct heat exchange relation with a combination isomerization and dehydrogenation catalyst comprising a silica-alumina-thoria complex mixed with a second catalyst comprising 10% chromite on alumina.

More specifically, the complex is prepared by mixing pure alkali-free silica gel in a solution of aluminum-thorium salts. The solution precipitated with ammonia, the precipitate thoroughly washed, dried and calcined at 500° C. for two hours, the original proportions of ingredients being such as to result in substantially the following composition:

$$20SiO_2:1Al_2O_3:1ThO_2$$

The $CrO_2Al_2O_3$ catalyst is prepared by absorbing 50 parts by weight of a 20% solution of chromium oxide per 90 parts by weight of a 6 to 10 mesh activated alumina, and drying the product. The two separate catalysts are thoroughly mixed in the ratio of about 3 parts of the former to 1 part of the latter. Preferably catalyst particle size is about 6–10 mesh.

The synthesis gas passes upwardly through the catalyst leaving the bed at about 600° F., the catalyst being discharged from the lower portion of the preheating vessel at a temperature about 1150° F. Preferably catalyst gravitates downwardly through the heating chamber without substantial agitation by the upflowing gases.

The synthesis gas from the preheating chamber at a temperature of about 600° F. passes directly into the inlet of a synthesis reactor containing a typical fluidized iron catalyst of 200 mesh and finer and containing about 1.5% of alumina and about 1% of sodium oxide. Temperature throughout the catalyst is maintained by suitable cooling coils at a uniform level of about 600° F. at a pressure of about 200 lbs. per square inch gauge. The upflowing reactants maintain the catalyst in a state of dense phase fluidization and the gasiform reaction products withdrawn consist essentially of hydrocarbons in both the gaseous and liquid ranges, together with water-vapor, carbon dioxide and small quantities of unreacted hydrogen and carbon monoxide. This gasiform stream is condensed, the water layer separated, and the combined liquid hydrocarbons and gaseous residue is preheated to 900° F. and passed in direct contact with the mass of catalyst previously preheated as above and withdrawn from the preheating vessel at a temperature of about 1150° F. Average temperature in this zone is maintained at about 1000° F. with a gaseous hourly space velocity of about 1000. The gaseous effluent from the conversion zone is condensed and separated into a motor gasoline fraction of about 80 octane by the CFR motor method, a relatively small fraction of higher boiling components, and a normally gaseous fraction which is returned to the inlet of the synthesis reactor with partial venting of the last-named stream in order to relieve the accumulation of methane, nitrogen and the like. When the foregoing example is followed under precisely the same conditions as above without, however, return of unsaturated hydrocarbon gases to the synthesis reactor the net production of liquid hydrocarbons is substantially reduced. There is, moreover, an increase in net hydrocarbon gas production.

While the invention has been illustrated largely in terms of one specific form of hydrocarbon conversion, it is broadly adaptable to widely varying types of conversion involving endothermic energy requirements at temperatures above 700° F. and wherein the catalyst is relatively inert with respect to the synthesis gas stream. Thus, the isomerization and dehydration of the foregoing example may be carried out in the temperature range of from about 900 to 1100° F. and preferably from about 950 to 1050° F. Space velocities may vary between 500 and 1200 on the foregoing basis.

In place of the combination isomerization and dehydrogenation catalyst, we may employ simply the silica - alumina - thoria complex described above. This is particularly advantageous where only normally liquid hydrocarbons boiling in the motor gasoline range are to be cycled to the catalytic conversion stage, the gaseous stream being separately recovered. Conversely, the conversion step may operate on simply a dehydrogenation catalyst, particularly when only the gaseous or lower hydrocarbons are to be recycled to the conversion zone and thence passed to the synthesis reactor for the production of additional motor gasoline fractions.

Other catalysts particularly useful in the present process are activated bauxite or activated alumina. These are particularly advantageous in reforming synthesis hydrocarbons and particularly in dehydrating oxygenated hydrocarbons normally occurring in the synthesis products with a correspondingly increased production of desirable motor gasoline hydrocarbons. In connection with these catalysts, conversion temperatures are preferably in the range of about 700–950° F., preferably 800–900° F. depending, as is known, upon the nature of the oil produced by the synthesis step and the types and quality of motor fuel required.

In addition to the foregoing, the conversion step of the invention may embody cracking, reforming, cyclization and aromatization of the synthetic hydrocarbons in the presence of any catalyst conventional for this purpose, and generally all others typical of endothermic hydrocarbon conversion processes. Obviously, reaction temperature, pressure and other conditions will be adjusted in accordance with the accepted optimum ranges recognized in the art for the catalyst in question. Moreover, the invention is not limited to catalytic conversion but in its broadest aspect, contemplates substitution of the conversion catalyst by a relatively inert heat absorptive thermophore, refractory at the temperatures involved and capable in the heated condition of promoting thermal decomposition and dehydrogenation of the hydrocarbon stream.

While regeneration of catalyst per se forms no part of the present invention, the conversion catalysts may well be so treated in any conventional manner, either periodically or as a part of the system of catalyst circulation. For example, a suitable regenerator may be interposed in the cycle, for example, subsequent to the conversion zone.

While the foregoing example is based upon a synthesis reaction employing an iron type of catalyst, the hydrocarbon synthesis may be carried out with any other suitable Fischer catalyst, typically metals of the iron group, such as iron, cobalt, nickel and ruthenium. In fact, it is particularly important to note that the invention finds a most preferred adaptation in connection with the use of typical cobalt synthesis catalysts wherein the liquid hydrocarbons obtained are usually of relatively low octane value capable of great improvement by conversion. In short, the improvement in motor gasoline characteristics of the liquid hydrocarbons is even greater than in the given example above.

It is to be understood, of course, that the invention contemplates the incorporation with the synthesis catalysts of any of the conventional activators and promoters in their usual proportions. Such, for example, are the alkali metal and alkaline earth metal oxides, thoria, zirconia, titanium, vanadium and uranium. The catalysts may be either discrete or supported upon a carrier such as diatomaceous earth, clay or silica gel.

Obviously, many other modifications and variations of the invention as hereinbefore set forth may be made without departing from the spirit and scope thereof, and therefore only such limitations should be imposed as are indicated in the appended claims.

I claim:

1. The method for synthesizing liquid hydrocarbons which comprises generating a high temperature stream of synthesis gas comprising essentially hydrogen and carbon monoxide, transferring sensible heat of said high temperature stream by passing said stream in heat transfer relationship with a hydrocarbon conversion catalyst until said hydrocarbon conversion catalyst reaches an elevated hydrocarbon conversion temperature, thereafter passing said synthesis gas under reaction conditions in contact with a hydrocarbon synthesis catalyst operative to promote the direct synthesis of normally liquid hydrocarbons, withdrawing hydrocarbon conversion catalyst from said synthesis gas stream at said elevated conversion temperature, passing a portion at least of said synthesis hydrocarbons in contact therewith for a time sufficient to result in conversion of said hydrocarbons, recovering converted liquid hydrocarbons and recycling normally gaseous hydrocarbon products of conversion to the hydrocarbon synthesis catalyst in admixture with the synthesis gas feed.

2. The method as defined in claim 1 wherein said hydrocarbon conversion catalyst comprises a reforming and dehydrogenation catalyst.

3. The method for synthesizing liquid hydrocarbons which comprises generating a high temperature stream of synthesis gas comprising essentially hydrogen and carbon monoxide, cooling said gas by passing it in heat transfer relationship with a solid, hydrocarbon conversion catalyst until said conversion catalyst reaches an elevated, hydrocarbon conversion temperature, thereafter passing said synthesis gas under reaction conditions in contact with a hydrocarbon synthesis catalyst until synthesis hydrocarbons are formed, separating said synthesis hydrocarbons from by-product water-vapor, withdrawing said conversion catalyst from said synthesis gas stream at said elevated temperature, passing normally liquid and normally gaseous fractions of said synthesis hydrocarbons in contact with said conversion catalyst for a time sufficient to result in conversion thereof, recovering said converted hydrocarbons, separating normally liquid fractions, and supplying normally gaseous fractions to the hydrocarbon synthesis catalyst in admixture with the synthesis gas feed.

4. The method for synthesizing liquid hydrocarbons which comprises generating a high temperature stream of synthesis gas comprising essentially hydrogen and carbon monoxide, cooling said gas by passing it in heat transfer relationship with a solid, hydrocarbon conversion catalyst having a dehydrogenating effect until said conversion catalyst has reached an elevated temperature and said synthesis gas stream has been cooled, thereafter passing said cooled synthesis gas into a reaction zone in contact with a hydrocarbon synthesis catalyst under reaction conditions operative to result in production of hydrocarbons, withdrawing reaction products from said reaction zone, separating hydrocarbons from said reaction products, withdrawing said conversion catalyst from the synthesis gas stream at said elevated temperature converting a portion at least of said hydrocarbons by contact with said conversion catalyst, recovering normally liquid hydrocarbons from the products of conversion, and returning normally gaseous conversion products to the hydrocarbon synthesis catalyst with the synthesis gas feed.

5. The method of synthesizing liquid hydrocarbons which comprises generating a high temperature stream of synthesis gas comprising essentially hydrogen and carbon monoxide, cooling said gas by passing it in heat transfer relationship with a solid, heat absorptive thermophore until said thermophore is heated to an elevated, hydrocarbon conversion temperature, thereafter passing said synthesis gas, under reaction conditions, in contact with a hydrocarbon synthesis catalyst operative to promote the reduction of carbon monoxide by hydrogen with the direct production of normally liquid and normally gaseous hydrocarbons, withdrawing said hydrocarbons from contact with said hydrocarbon synthesis catalyst, withdrawing said thermophore from the said synthesis gas stream at said elevated conversion temperature, passing a portion at least of the withdrawn hydrocarbons in contact with said heated thermophore for a time sufficient to result in substantial conversion of the hydrocarbons, recovering normally liquid hydrocarbons from the products of conversion and returning normally gaseous conversion products into contact with the synthesis catalyst in combination with the synthesis gas supplied thereto.

6. The method according to claim 5, wherein the said withdrawn hydrocarbons passed in contact with said thermophore comprise normally liquid hydrocarbons.

7. The method according to claim 5, wherein the said withdrawn hydrocarbons passed in contact with said thermophore comprise normally liquid hydrocarbons remaining after separation of liquid hydrocarbons boiling above the motor gasoline boiling range.

8. The method according to claim 5, wherein the said withdrawn hydrocarbons passed in contact with said thermophore comprise essentially normally gaseous hydrocarbons.

9. The method of synthesizing liquid hydrocarbons which comprises generating a high temperature stream of synthesis gas, comprising essentially hydrogen and carbon monoxide, recovering sensible heat from said high temperature stream by passing said stream in heat transfer relationship with a hydrocarbon conversion catalyst until said hydrocarbon conversion catalyst reaches an elevated, hydrocarbon conversion temperature, thereafter passing said synthesis gas, under reaction conditions, in contact with a hydrocarbon synthesis catalyst under operating conditions effective to form normally liquid and normally gaseous hydrocarbons, withdrawing thus formed hydrocarbons from contact with said hydrocarbon synthesis catalyst, withdrawing hydrocarbon conversion catalyst from said synthesis gas stream at said elevated conversion temperature, passing a portion at least of said hydrocarbons in contact with said withdrawn conversion catalyst at conversion temperature for a time sufficient to result in substantial conversion thereof, recovering normally liquid hydrocarbons from the products of conversion and recycling normally gaseous hydrocarbon products of conversion to the hydrocarbon synthesis catalyst in admixture with the synthesis gas feed.

10. The method according to claim 9, wherein said hydrocarbons passed in contact with said conversion catalyst comprise normally liquid hydrocarbons.

11. The method according to claim 9, wherein said hydrocarbons passed in contact with said conversion catalyst comprise normally liquid hydrocarbons remaining after separation of liquid hydrocarbons boiling above the motor gasoline boiling range.

12. The method according to claim 9, wherein said hydrocarbons passed in contact with said conversion catalyst comprise essentially normally gaseous hydrocarbons containing from 2 to 4 carbon atoms per molecule.

13. The method according to claim 9, wherein said hydrocarbon conversion catalyst is a reforming catalyst effective to convert oxygenated hydrocarbons to olefins.

JAMES H. GRAHAME.

REFERENCES CITED

The following references are of record in the file of this patent:

UNITED STATES PATENTS

| Number | Name | Date |
| --- | --- | --- |
| 2,243,869 | Keith, Jr. et al. | June 7, 1941 |
| 2,396,709 | Leffer | Mar. 19, 1946 |